Figure 1:
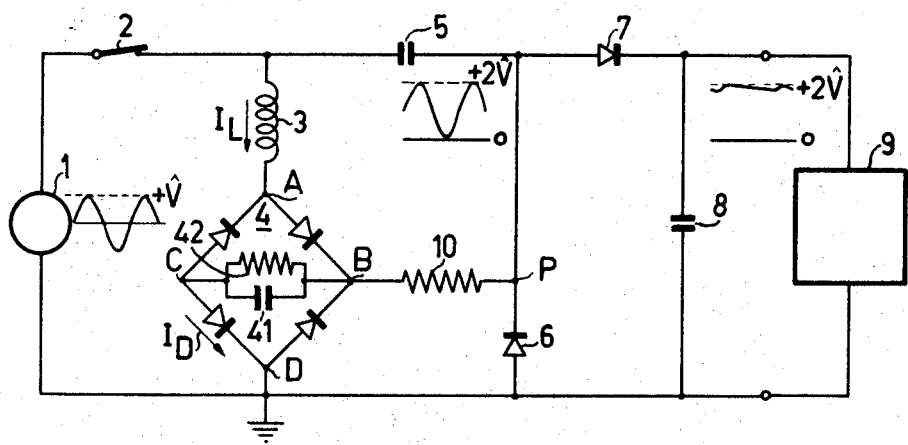

United States Patent

[11] 3,582,721

[72] Inventors Louis van Hoorn;
 Peter Johannes Hubertus Janssen; Jan Lolke de Vries, all of Emmasingel, Eindhoven, Netherlands
[21] Appl. No. 801,338
[22] Filed Feb. 24, 1969
[45] Patented June 1, 1971
[73] Assignee U. S. Philips Corporation New York, N.Y.
[32] Priority Mar. 2, 1968
[33] Netherlands
[31] 6803012

[54] DEMAGNETIZING CIRCUIT ARRANGEMENT WITH DC VOLTAGE MEANS TO REDUCE CURRENT THROUGH THE DEMAGNETIZING COIL TO ZERO
18 Claims, 5 Drawing Figs.
[52] U.S. Cl. ..................................... 317/157.5, 315/8
[51] Int. Cl. ..................................... H01h 47/00, H01f 13/00

[50] Field of Search .......................... 317/157.5, 157.51; 315/8

[56] References Cited
UNITED STATES PATENTS
3,344,307  9/1967  Van An Rooy et al........ 315/8

Primary Examiner—Milton O. Hirshfield
Assistant Examiner—Ulysses Weldon
Attorney—Frank R. Trifari ABSTRACT: A demagnetizing circuit arrangement to be supplied by an AC voltage source and suitable for rapidly repeated demagnetization, including a demagnetizing coil in series with a full-wave rectifier circuit. For obtaining, after switching on the demagnetizing circuit arrangement, a demagnetizing current having an amplitude decreasing to the zero value without the current being interrupted by an additional switch the circuit arrangement according to the invention is provided with a DC voltage source formed, for example, as a rectifier circuit, the increasing maximum voltage of which causes the full-wave rectifier circuit to interrupt the demagnetizing current.

PATENTED JUN 1 1971

3,582,721

SHEET 1 OF 2

INVENTORS
LOUIS van HOORN
PETER J.H. JANSSEN
JAN H. De Vries

Frank R. Trifari
AGENT

DEMAGNETIZING CIRCUIT ARRANGEMENT WITH DC VOLTAGE MEANS TO REDUCE CURRENT THROUGH THE DEMAGNETIZING COIL TO ZERO

The present invention relates to a demagnetizing circuit arrangement which can be connected to an AC voltage source and is provided with a series arrangement of a demagnetizing coil and a full-wave rectifier circuit, the rectifier circuit including unidirectional current-conducting elements and at least one capacitor connected so that an alternating current having a decreasing amplitude flows in the demagnetizing coil after switching on the AC voltage source.

Such a demagnetizing circuit arrangement is known from German Auslegeschrift 1,247,380. That arrangement serves to demagnetize the ferromagnetic parts magnetized, for example, by earth magnetism, such as the screening cap and the shadow mask of shadow mask color television display tubes. With the aid of the rectifier circuit, designed as a Grätz circuit, it is achieved that the switch-on current pulse through the demagnetizing coil has a high value such that the ferromagnetic material to be demagnetized is first magnetized into a condition of saturation. The result of charging the capacitor in the Grätz rectifier circuit through the demagnetizing coil is that an alternating current of decreasing amplitude flows in the coil so that demagnetization is effected in known manner.

It is required that the value of the current flowing through the demagnetizing coil be decreased to substantially zero after demagnetization, since otherwise a disturbing magnetic residual field may be generated by the residual current. The current may be rendered equal to zero by including a switch, for example, in series with the demagnetizing coil, which switch is opened when the value of the demagnetizing current is sufficiently low. Such a solution employing, for example, a switch based on thermal operation has the drawback that a long cooling period for the switch heating element is required when demagnetization is repeated. The solution employing a switch formed as a relay is very expensive and hence is also unattractive.

In the solution given in the said German Auslegeschrift, a residual current of a low value is permitted to flow through the coil. This current value is determined by the load parallel to the capacitor and the leakage resistance of the capacitor in the Grätz rectifier circuit. For obtaining a very low negligible value of the residual current in the coil it is required that the said load be small or that the resistance of a resistor connected parallel to the capacitor be high. The result is that the discharge time of the capacitor is long due to the large time constant thus obtained, and may amount to many minutes. Since for a satisfactory demagnetization the capacitor in the Grätz rectifier circuit must substantially be discharged upon switching on the demagnetizing circuit arrangement, it appears that a long waiting time for discharging the said capacitor must be observed. Reduction of the waiting time by loading the capacitor in the Grätz rectifier circuit to a higher value has the result that the residual current flowing through the demagnetizing coil obtains a higher inadmissible value.

It is an object of the invention to provide a demagnetizing circuit arrangement in which the current flowing through the demagnetizing coil decreases to zero after demagnetization without using an additional switch to achieve this end, while the waiting time to be observed during which the capacitor in the rectifier circuit discharges is kept very short. To this end, the demagnetizing circuit arrangement according to the invention is characterized in that for obtaining the zero value of the current in the demagnetizing coil after a given delay time, the demagnetizing circuit arrangement is provided with a DC voltage source which is connected parallel to the said capacitor in the rectifier circuit. The voltage value of said DC voltage source increases after switching on the AC voltage source, to a value which is higher than the value of the rectified voltage which is produced across the said capacitor by the AC voltage source.

Figure 2:
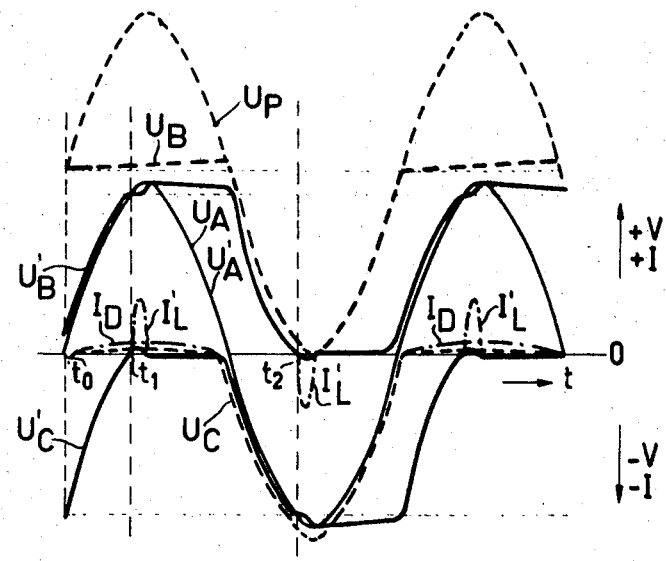
Figure 3:
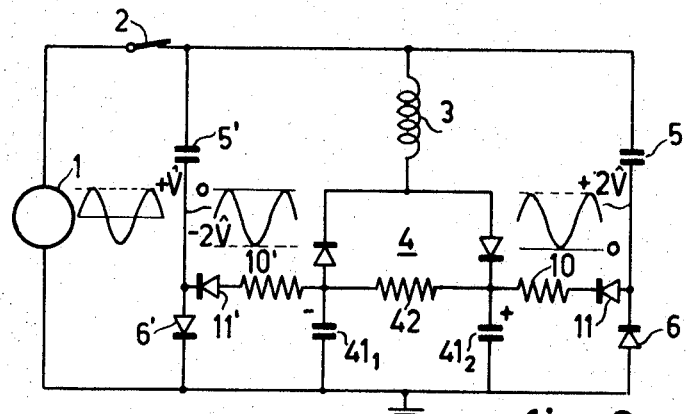
Figure 4:
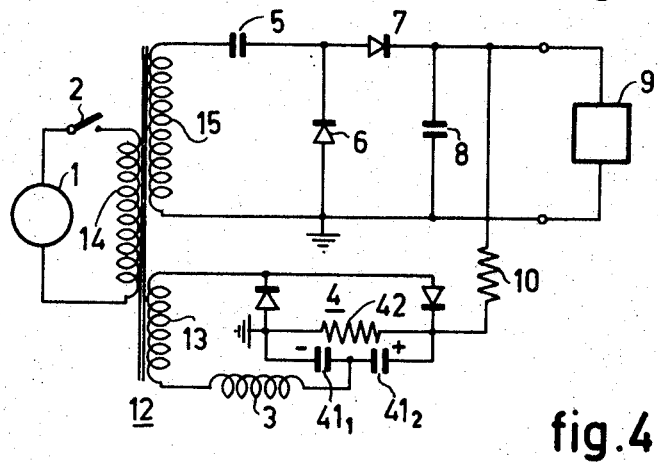
Figure 5:
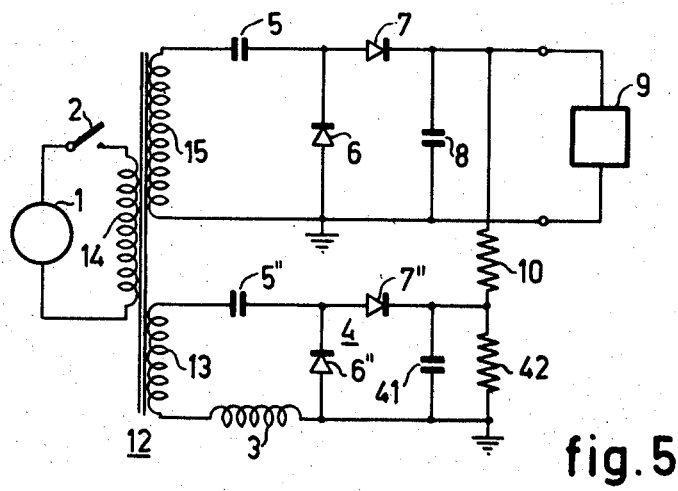

In order that the invention may be readily carried into effect it will now be described in detail, by way of example, with reference to the accompanying diagrammatic drawings, in which:

FIG. 1 shows a demagnetizing circuit arrangement according to the invention, including a full-wave rectifier circuit designed as a Grätz circuit, FIG. 2 shows several waveforms that appear in the circuit of FIG. 1 and serve to explain the operation of said FIG. 1 circuit, FIG. 3 shows a demagnetizing circuit arrangement according to the invention including a full-wave rectifier circuit designed as a Greinacher-Delon circuit, FIG. 4 shows a second demagnetizing circuit arrangement according to the invention including a Greinacher-Delon circuit, and FIG. 5 is a further demagnetizing circuit arrangement according to the invention.

In FIG. 1, an AC voltage source 1, one end of which is connected to ground, is connected through a switch 2 to a series arrangement of the demagnetizing coil 3 and a rectifier circuit 4 designed as a Grätz circuit. AC voltage source 1 may, for example, represent an AC voltage supply and, as shown at source 1, produces a voltage the amplitude of which is $\hat{V}$ volt. A series arrangement of a capacitor 5 and a unidirectional current-conducting element, i.e. a diode 6, is likewise connected parallel to AC voltage source 1 through switch 2. Analogous to the foregoing further unidirectional current-conducting elements employed in the circuit arrangements to be described will be indicated by diodes although, for example, transistor solutions are alternatively possible.

In the switched-on condition of switch 2 the junction of capacitor 5 and the cathode of the diode 6 (whose anode is connected to ground) conveys a DC voltage as shown in the figure. The value of this voltage numeral varies between 2 $\hat{V}$ volt and the ground potential indicated by a reference numeral $o$. A diode 7 in series with a capacitor 8 is connected in parallel to diode 6. The diodes 6 and 7 have opposite current directions. The terminal of capacitor 8 connected to the cathode of diode 7 thus conveys a DC voltage, as shown in the figure, which exhibits a ripple component and has a more or less constant value of 2 $\hat{V}$ volt. A load 9 is connected parallel to capacitor 8.

For a color television receiver provided with a demagnetizing circuit arrangement, load 9 may, for example, represent the DC voltage load of the receiver. In the switched-on condition of switch 2 a more or less constant DC voltage for the receiver is produced with the aid of capacitors 5 and 8 and diodes 6 and 7 in the full-wave rectifier doubler circuit described. Switch 2 may be the supply voltage switch of the receiver so that the capacitors 5 and 8 are charged from ground potential up to the voltage values already indicated after switching on said switch.

In a color television receiver having a display tube and a shadow mask, demagnetizing coil 3, which may consist of a plurality of partial coils, is wound around the cone of the display tube. For demagnetizing, for example, the ferromagnetic components which are magnetized by earth magnetism, such as the said shadow mask, the switching on of switch 2 must have the result that an alternating current having an amplitude decreasing to substantially zero is directed through coil 3. For obtaining such an alternating current the rectifier circuit 4, which must be of the full-wave rectifying type, is arranged in series with coil 3. The design of rectifier circuit 4 as a Grätz circuit is sufficiently known to give a brief description of the rectifying operation with the aid of the diodes shown. Of rectifier circuit 4 there are only further indicated: junction A, B, C and D, a capacitor 41 for rectification and a load therefor formed as a resistor 42. The closing of switch 2 has the result that the previously uncharged capacitor 41 is charged by the AC voltage source 1 to a voltage having a more or less constant value of V volt. The charging of the capacitor under the influence of AC voltage source 1 results in a pulsatory direct current having a decreasing amplitude during the switch-on phenomenon, the current flowing from junction B to capacitor 41. This current corresponds to an alternating current $I_L$ flowing through coil 3 and its amplitude decreases in a corresponding manner. This decrease continues up to a current value in the steady-state condition at which the charge supplied to capacitor 41 is equal to that removed by the resistor 42 parallel to capacitor 41 and the leakage resistance of capacitor 41. It appears that the extent of discharge of the capacitor 41 across resistor 42 and across its natural leakage resistance determines the value of the remaining current flowing through the demagnetizing coil 3 after demagnetization has taken place. It is desirable to obtain, after demagnetization, a value of the current remaining in coil 3 which is so small that no disturbing magnetic field is generated by this current. It will be evident that to achieve this end the value of resistor 42 must be large so that only a small dissipation occurs in resistor 42 in the steady-state condition.

For a satisfactory demagnetization the maximum value of the current pulse through demagnetizing coil 3 after switching on switch 2 must be so large that the ferromagnetic components to be demagnetized are magnetized into the saturation condition. To this end it is required that capacitor 41 has substantially no charge prior to switching on switch 2. For a desired repeated demagnetization it is therefore necessary that after switching off switch 2, a waiting time must be provided during which capacitor 41 can discharge. For obtaining a reasonable waiting time which is not too long it is thus required that the value of resistor 42 be sufficiently small.

It follows from the foregoing that without further steps a compromise occurs between a disturbance-free operation of the color television receiver after demagnetization on the one hand, and a short waiting time for a repeated demagnetization after switching off the receiver on the other hand. The following serves to illustrate the compromise, starting from a waiting time, during which the voltage across capacitor 41 has decreased to approximately 2 percent after switching off switch 2, it follows that the waiting time is approximately equal to four times the time constant of resistor 42 and capacitor 41. For a value of capacitor 41 of 800 $\mu f.$, waiting times of approximately 25, 5 or 2½ minutes follow for the values of the resistor 42 of 500 k. ohm, 100 k. ohm or 50 k. ohm, respectively, while the values of residual current in, coil 3 having 80 turns were 5, 40 or 60 ma., respectively, in a practical embodiment of the circuit. The latter two values were found to be completely impermissible.

To obviate the compromise described, the demagnetizing circuit arrangement according to the invention includes a connection through a resistor 10 between the junction B of the terminal of capacitor 41 conveying the positive voltage in the rectifier circuit 4 and the junction P of the capacitor 5 and the diode 6, which together form a rectifier circuit. In this manner a DC voltage source built up from capacitor 5 and diode 6 is connected parallel to capacitor 41 by means of resistor 10. Through this DC voltage source so much charge is supplied to capacitor 41 in the steady-state condition after demagnetization that the voltage across capacitor 41 is higher than that which is produced under the influence of AC voltage source 1 and rectifier circuit 4. The result is that no alternating current can flow through coil 3 in the stationary condition after demagnetization since a few diodes in the rectifier circuit 4 can no longer conduct and thus serve as opened switches.

To explain the operation of the demagnetizing circuit arrangement of FIG. 1, a few characteristics are diagrammatically plotted in FIG. 2 which represent voltages and currents as a function of time. The characteristics are shown for the case of demagnetization already having taken place, that is to say, in the steady-state condition after switching on switch 2. The voltages between the junctions A, B, C and the junction D connected to ground are indicated by $U'_A$, $U'_B$ and $U'_C$, respectively, for the case where the connection between the junctions B and P is absent. The characteristics for the case of this connection being present, according to the invention, are indicated by $U_A$, $U_B$ and $U_C$, respectively. The difference of reference indication equally applies to the current $I'_L$ flowing through coil 3 and the current $I_D$ flowing through the diode which connects junction C to ground. For obtaining a simple FIG. 2 the difference between voltages $U_A$ and $U'_A$ has been omitted since this difference is irrelevant for explanation of the invention. Consequently, it may be assumed that the voltage $U_A$ or $U'_A$ is substantially equal to the AC voltage which is supplied by AC voltage source 1.

When the invention is not used, that is to say, for ordinary use of the rectifier circuit 4 of FIG. 1 designed as a Grätz circuit, there applies that a conducting connection approximately near the positive maximum value of voltage $U'_A$ occurs between the junctions AB, BC and CD hereinafter indicated by conducting connection ABCD, dependent on the dissipation in resistor 42 and the consequent voltage loss across capacitor 41. The initial instant of said connection is indicated by $t=t_1$. A current $I'_L$ flows through the connection ABCD and hence through coil 3 until the voltage $U'_A$ has reached its maximum value. Due to the small voltage drop across the diodes in the connections AB and CD the voltages $U'_A$ and $U'_C$, respectively, are slightly larger than the voltage $U'_B$ and the ground potential, respectively. After the maximum value of voltage $U'_A$ has been reached it decreases in accordance with a cosine function while the voltage $U'_B$ decreases less rapidly as a function of the dissipation in resistor 42. The conducting connection ABCD is thus cut off and the voltage $U'_C$ becomes slightly negative so that the diode connected between junctions C and D does not conduct due to the so-called threshold voltage. The fact that the voltage $U'_A$ becomes negative has the result that, apart from the threshold voltage, the voltage $U'_C$ follows the voltage $U'_A$. Since the voltage across capacitor 41 is more or less constant (a small decrease is caused by a small voltage loss due to the said dissipation) the waveform of voltage $U'_B$ varies in the same manner as that of the voltage $U'_C$. At the instant $t=t_2$ the voltage $U'_B$ is substantially equal to the ground potential at junction D, while voltage $U'_A$ becomes slightly more negative than voltage $U'_C$ due to the said voltage loss across capacitor 41. The result is that the conducting connection DBCA occurs. In a manner similar to that which occurred after the instant $t_1$ a current $I'_L$ will flow through coil 3, but in the opposite direction. As already indicated in the foregoing it appears that in the stationary condition after switching on switch 2 a pulsatory current flows through coil 3. The amplitude of this current is dependent on the voltage loss across capacitor 41 between the instants $t_1$ and $t_2$.

Starting from a comparatively small value of resistor 42 and hence a great voltage loss across capacitor 41 such that in the steady-state condition a current $I'_L$ flowing through the coil 3 would be impermissibly large, the following applies to the circuit arrangement according to the invention: the junction P of FIG. 1 has a DC voltage $U_P$ (see FIG. 2) which in the steady-state condition varies between the value +2 V volts and ground potential after switching on switch 2. Assuming the voltage $U_P$ exceeds, at an instant $t=t_0$, the voltage $U_B$ which is set up across the junctions B,C,D. The diode between the junctions C and D will then start to conduct a current $I_C$. During the period that the voltage $U_P$ is larger than the voltage $U_B$ the conducting condition will continue and a positive charge is supplied to capacitor 41 through resistor 10 (across which a voltage drop $U_P - U_B$ occurs). From the instant when the voltage $U_P$ becomes smaller than the voltage $U_B$, which has slightly increased due to the supply of charge, the diode is cut off between the junctions C and D. The result is that voltage $U_B$ will follow the further decreasing voltage $U_P$. Since the voltage across capacitor 41 is more or less constant (a small decrease is caused by the voltage loss due to the dissipation in resistor 42 already mentioned) the voltage $U_C$ follows the voltage $U_B$ and hence the voltage $U_P$ in a uniform manner.

FIG. 2 shows that by choosing the voltage $U_B$ to be sufficiently large at the instant $t=t_0$, the value of voltage $U_B$ will never be smaller than that of voltage $U_A$. The diode between the junctions A and B will therefore be unable to conduct in the steady-state condition which occurs some time after switching on switch 2. The same applies to the diode between the junctions A and C since the voltage $U_C$ will always be more negative than the voltage $U_A$. Thus it appears that, with the aid of resistor 10 between the junctions P and B, in the steady-state condition the diodes between the junctions A and C, and A and B in the rectifier circuit 4 serve as opened switches after switching on switch 2.

In the demagnetizing circuit arrangement according to the invention, as shown in FIG. 1, it appears that the diode 7, capacitor 8 and load 9 are not essential. The construction of load 9 as the DC voltage load of a color television receiver for which demagnetization of ferromagnetic parts is required, provides, however, the possibility of a simple combination of a demagnetizing circuit arrangement and a DC voltage doubler circuit.

Since the transient phenomenon caused by switching switch 2 is used in the demagnetizing circuit arrangement it will be evident that the extent to which the voltage across capacitor 41 is built up as from the instant of switching on must be determined in the first place by the current flowing through the demagnetizing coil 3. After demagnetization the voltage across capacitor 41 must only be determined by the current which flows through resistor 10 so that the current flowing through coil 3 is reduced to zero according to the principle of the invention. All this may be achieved by adapting the capacitor charge times of the rectifier circuits used until the steady-state condition is reached, which times are determined by the values of the capacitors, resistors and loads. For example, a longer period between switching on switch 2 and reaching the steady-state condition for the rectifier circuit including capacitors 5 and 8 relative to that including capacitor 41 can simply be obtained by the choice of the capacitances and resistances. A satisfactory demagnetization is achieved with the aid of an embodiment of a circuit arrangement of FIG. 1 for a supply voltage 117 V and having the following values:

capacitors 45,5 = 800 $\mu$f.
capacitor 8 = 500 $\mu$f.
resistor 42 = 22 k. ohm
resistor 10 = 4700 ohm at which a waiting time of approximately 1 minute for repeated demagnetization occurred after opening switch 2.

FIG. 3 shows an embodiment of a demagnetizing circuit arrangement according to the invention in which a rectifying circuit 4 is constructed as the known Greinacher-Delon circuit, by means of which a double DC voltage is also obtained. Components already indicated in the description of FIG. 1 and corresponding to those of FIG. 3 are mainly denoted by the same reference numerals.

A few series arrangement are connected parallel to switch 2 and AC voltage source 1 having a voltage of amplitude V. The first series arrangement of demagnetizing coil 3 and rectifier circuit 4 includes a rectifier capacitor which consists of two partial capacitors $41_1$ and $41_2$ the interconnected terminals of which are connected to ground. A DC voltage is impressed on the other terminals of capacitors $41_1$ and $41_2$ through demagnetizing coil 3 and two diodes connected in the opposite current direction, the negative and positive polarities of said DC voltage being indicated by a minus symbol and a plus symbol, respectively. A load formed as a resistor 42 is provided between the two last-mentioned terminals.

According to a step of the invention a second series arrangement of a capacitor 5 and a diode 6 whose cathode is connected thereto is connected parallel to the first series arrangement. The cathode of diode 6 is also connected to the anode of a diode 11 the cathode of which is connected to the terminal of capacitor $41_2$ indicated by the plus symbol through a resistor 10. According to a further step of the invention a third series arrangement of a capacitor 5' and a diode 6' whose anode is connected thereto is connected parallel to the first-mentioned series arrangement. The anode of diode 6' is also connected to the cathode of a diode 11'. The anode of diode 11' is connected through a resistor 2 to the terminal of capacitor $41_1$ indicated by the minus symbol. The result of the two steps is that the anode of diode 11 and the cathode of diode 11', respectively, convey DC voltages, as shown in the figures which vary between +2 $\hat{V}$ volt and −2 $\hat{V}$ volt, respectively, relative to ground potential.

Unless the said steps are taken the DC voltage which is impressed by AC voltage source 1 having voltage amplitude $\hat{V}$ volt on the terminals of capacitors $41_2$ and $41_1$ indicated by a plus symbol and a minus symbol, respectively, in the rectifier circuit 4 can certainly not become more positive or more negative, respectively, than the value $\hat{V}$ volt. As a function of the dissipation in resistor 42 the mean value of the said voltages would then lie below the $\hat{V}$ limit. The steps according to the invention have the result that the diodes 11 and 11', respectively, conduct for those values at which the voltages occurring at the anode of diode 11 and the cathode of diode 11' are more positive and more negative, respectively, than the voltage across the positive terminal of capacitor $41_2$ and across the negative terminal of capacitor $41_1$, respectively. By applying, after termination of the desired transient phenomenon already described, so much charge through the diodes 11 and 11' and resistors 10 and 10' to capacitors 41 and $41_1$ that the voltages across these capacitors never decrease in absolute value below $\hat{V}$ volt in the stationary condition, the diodes in rectifier circuit 4 will always remain cut off irrespective of the dissipation in resistor 42.

The functions of diodes 11 and 11' of FIG. 3 are that capacitors $41_2$ and $41_1$, respectively, do not discharge through resistors 10 and 10', respectively, during the period that the voltages at the anode and cathode are less positive and less negative, respectively.

For an embodiment of the demagnetizing circuit arrangement of FIG. 3 a few values are, for example,:

capacitors $41_1$ and $41_2$ = 375 $\mu$f.
resistor 42 = 27 k. ohm
capacitor 5 and 5' = 2 $\mu$f.
resistors 10 and 10' = 1 k. ohm It will be evident that in a manner similar to that described in FIG. 1, the rectifier circuit including capacitors 5 and 5' and diodes 6 and 6' may be incorporated in a voltage doubler rectifier circuit.

A DC voltage source including capacitor 5', diode 6' and resistor 10' shown in FIG. 3 may alternatively be used in FIG. 1 instead of the DC voltage source described therein and including capacitor 5, diode 6 and resistor 10. Resistor 10' then must be connected to the junction C of the Grätz rectifier circuit. The result is that only the diode between junctions B and D will convey current during part of the period of the AC voltage in the stationary condition.

FIG. 4 shows an embodiment of a demagnetizing circuit arrangement according to the invention in which the components already described in FIGS. 1 and 3 are denoted by the same reference numerals. The demagnetizing circuit arrangement includes a Greinacher-Delon circuit which, relative to that shown to FIG. 3, is connected to ground at a different point, namely the terminal of capacitor $41_1$ indicated by a minus symbol. Demagnetizing coil 3 connects the interconnected capacitors $41_1$ and $41_2$ to a tertiary winding 13 provided on a transformer 12, the other side of which is connected to the diodes in rectifier circuit 4. Of course coil 3 may alternatively be connected to the said other side of winding 13. A primary winding 14 of transformer 12 is connected parallel to an AC voltage source 1 and a switch 2. A secondary winding 15 is connected to a voltage doubler rectifier circuit of the kind already described in FIG. 1, which is built up of capacitors 5, 8 and diodes 6, 7.

According to the invention the number of turns of secondary 15 in FIG. 4 is larger than that of tertiary 13, while a resistor 10 is provided which connects the side of resistor 42 remote from ground parallel to capacitors $41_1$ and $41_2$ to the terminal of capacitor 8 conveying a more or less constant DC voltage.

After termination of the desired transient phenomenon that occurs after switch 2 is closed, a positive DC voltage, which is more or less constant, is impressed through resistor 10 upon capacitors $41_1$ and $41_2$ due to the difference in the number of turns on windings 15 and 13. This DC voltage is higher than that which is produced through winding 13. Due to the voltage division across capacitors $41_1$ and $41_2$ which are substantially equal, no current flows through coil 3 due to the diodes in the rectifier circuit 4 being cut off in the steady-state condition.

FIG. 5 shows an embodiment of a demagnetizing circuit arrangement according to the invention wherein only the construction of rectifier circuit 4 is different relative to that shown in FIG. 4, namely similar to the full-wave DC voltage rectifier doubler circuit already described. The components in rectifier circuits 4 corresponding to the capacitor 5, diodes 6 and 7 and capacitor 8 are indicated by reference numerals 5'', 6'', 7'' and 41, respectively. A load comprising a resistor 42 is provided parallel to capacitor 41, one side of said load being connected to ground and the other side being connected to resistor 10.

Diode 7'' will be cut off by impressing, after the desired transient phenomenon described, in the steady-state condition, a positive DC voltage through resistor 10 on capacitor 41. This voltage is higher than that which could be produced with the aid of winding 13. Apart from small negligible losses in the leakage resistance of capacitor 5'' the voltage across capacitor 5'' will be constant so that the diode 6'' will be cut off. The result is that in the steady-state condition no current flows through demagnetizing coil 3, which can alternatively be connected between winding 13 and capacitor 5''. Opening switch 2 has the result that capacitor 41 discharges across resistor 42 and capacitor 5'' discharges through resistor 42, demagnetizing coil 3 and tertiary 13.

It appears in a simple manner from the circuit arrangements shown in FIGS. 4 and 5 that resistor 42 is not essential to the invention. If resistor 42 is not present, resistor 10 will perform a dual function. After switching on switch 2, resistor 10 serves in the manner as described as a charge resistor for capacitor $41_1$, $41_2$ (FIG. 4) or 41 (FIG. 5). After switching off switch 2, resistor 10 serves as a discharge resistor connected in series with load 9, which together form a discharge circuit. It appears that resistor 10 and load 9 have taken over the function of resistor 42.

In the circuit arrangements shown in FIGS. 4 and 5 a positive voltage is applied to rectifier circuit 4 through a resistor 10 which may be omitted. It is readily evident that a negative voltage must be applied to rectifier circuit 4 when resistor 42 is connected to ground on the side other than the one shown.

It will be evident that the load for the full-wave rectifier circuit 4, shown as a resistor 42, may alternatively be formed in a different manner representing, for example, the filament supply of the filaments occurring in a television receiver.

We claim:

1. A demagnetizing circuit adapted to be connected to an AC voltage source comprising, a series arrangement of a demagnetizing coil and a full-wave rectifier circuit, a switch interconnecting said voltage source with said series arrangement, the rectifier circuit including one or more unidirectional current-conducting elements and at least one capacitor connected so that an alternating current of decreasing amplitude flows in the demagnetizing coil after switching on the AC voltage source, and a DC voltage source connected parallel to said capacitor in the rectifier circuit, the voltage of said DC voltage source increasing, after switching on the AC voltage source, to a value which is higher than the value of the rectified voltage which is produced across said capacitor by the AC voltage source, whereby the current in the demagnetizing coil is reduced to zero after a short delay time.

2. A demagnetizing circuit as claimed in claim 1, wherein the DC voltage source comprises a rectifier circuit which is connected to the AC voltage source via said switch and reaches a steady-state condition subsequent to closure of the switch within a time period which is longer than the time period required by the full-wave rectifier circuit to reach its steady-state condition.

3. A demagnetizing circuit as claimed in claim 1 wherein the DC voltage source comprises a rectifier circuit connected to the AC voltage source via said switch, the latter rectifier circuit comprising a series arrangement of a second capacitor and a unidirectional current-conducting element having a junction at which a varying DC voltage is produced, and means connecting said junction through a resistor to a terminal of said capacitor in the full-wave rectifier circuit.

4. A demagnetizing circuit as claimed in claim 3 wherein said full-wave rectifier circuit comprises a plurality of unidirectional current elements connected to form a Grätz rectifier circuit, and means connecting said terminal of the capacitor in the full-wave rectifier circuit through the resistor and the second capacitor to the demagnetizing coil.

5. A demagnetizing circuit as claimed in claim 3 wherein said full-wave rectifier circuit includes at least two unidirectional current-conducting elements connected with opposite polarity and a third capacitor connected to form a Greinacher-Delon circuit, the demagnetizing coil being connected to a common junction of said two unidirectional current-conducting elements, means connecting the other side of each unidirectional element to a terminal of a different capacitor of said full-wave rectifier circuit, and means connecting one of said capacitor terminals through the resistor and the second capacitor to the side of the demagnetizing coil remote from the full-wave rectifier circuit.

6. A demagnetizing circuit as claimed in claim 5 wherein said resistor is connected to a further unidirectional current-conducting element which is polarized in the same direction as that unidirectional current-conducting element in the Greinacher-Delon circuit which is connected to the capacitor terminal.

7. A demagnetizing circuit as claimed in claim 1 further comprising a transformer having primary, secondary and tertiary windings, means connecting said primary winding to said voltage source via said switch, said DC voltage source comprising a rectifier circuit for generating a more or less constant DC voltage which is connected to said secondary of the transformer, said tertiary winding having fewer turns than the said secondary winding, and means connecting the tertiary to the series arrangement of the demagnetizing coil and the full-wave rectifier circuit.

8. A demagnetizing circuit as claimed in claim 7 wherein said full-wave rectifier circuit includes at least two unidirectional current-conducting elements connected together with opposite polarity and a third capacitor connected in series with the first capacitor, a load having one terminal connected to ground and the other terminal connected to the DC voltage source, and means connecting said load in parallel with the series connected capacitors of said full-wave rectifier circuit.

9. A demagnetizing circuit for use in a television receiver comprising, an AC voltage source, a switch, a demagnetizing coil, a plurality of unidirectional current-conducting elements and a first capacitor connected together to form a full-wave rectifier circuit, means connecting the demagnetizing coil in series circuit with the full-wave rectifier circuit, means connecting the aforesaid series circuit to said AC voltage source via said switch so that upon closure of the switch an alternating current of decreasing amplitude flows in the demagnetizing coil for a brief time period, and means for reducing the steady-state current in said coil to a minimum value comprising a DC voltage source coupled across said capacitor to apply thereto a voltage that is higher than the rectified voltage developed across said capacitor by the AC voltage source and of the same polarity.

10. A demagnetizing circuit as claimed in claim 9 wherein said DC voltage source comprises a second capacitor and a diode connected in series to form a second rectifier circuit, means connecting said second rectifier circuit to said AC voltage source via said switch so that a varying DC voltage of increasing amplitude is developed at one terminal of the second capacitor upon closure of the switch, and means connecting the latter terminal to a terminal of the first capacitor so as to apply thereto said higher voltage.

11. A demagnetizing circuit as claimed in claim 10 wherein the parameters of said rectifier circuits are chosen so that, upon closure of the switch, the time delay before said second rectifier circuit reaches a steady-state condition is longer than the time delay required by the full-wave rectifier circuit to reach its steady-state condition.

12. A demagnetizing circuit as claimed in claim 11 further comprising a discharge circuit connected across said first capacitor, and a third capacitor and a second diode connected in circuit with said second capacitor and the first diode to form a voltage doubler circuit.

13. A demagnetizing circuit as claimed in claim 9 where said DC voltage source comprises a second capacitor and a diode connected in series across said AC voltage source via said switch, and a third capacitor and a second diode connected in series across the first diode with the polarity of said second diode opposite to that of the first diode, and a resistor connected between said first capacitor and a junction between one of said diodes and its associated series capacitor for applying said higher voltage to the first capacitor.

14. A demagnetizing circuit as claimed in claim 9 wherein said DC voltage source comprises a second capacitor and a diode connected in series to form a second rectifier circuit, means connecting said second rectifier circuit to said AC voltage source via said switch, and wherein said full-wave rectifier circuit includes a third capacitor and first and second diodes connected together with the first capacitor to form a bridge circuit having the diodes connected with opposite polarity, and a resistor interconnecting at least one capacitor of the full-wave rectifier with said second capacitor.

15. A demagnetizing circuit as claimed in claim 14 further comprising a third diode connected in series with said resistor between said one capacitor and said second capacitor.

16. A demagnetizing circuit as claimed in claim 9 wherein said full-wave rectifier circuit is connected to form a first voltage doubler circuit, and said DC voltage source comprises a plurality of diodes and capacitors connected to form a second voltage doubler circuit that is connected to said AC voltage source via said switch, the DC output voltage of said second voltage doubler being higher than the DC output voltage of the first voltage doubler, and means connecting the second voltage doubler circuit to the first voltage doubler circuit.

17. A demagnetizing circuit as claimed in claim 9 further comprising a transformer having a primary winding, a secondary winding and a tertiary winding, said tertiary winding having fewer turns than the secondary winding, means connecting the primary winding across the AC voltage source via said switch, said DC voltage source comprising a rectifier circuit that includes a diode and a second capacitor serially connected across the secondary winding, and means connecting the series arrangement of the demagnetizing coil and the full-wave rectifier circuit across said tertiary winding.

18. A demagnetizing circuit as claimed in claim 17 wherein said full-wave rectifier circuit includes first and second diodes connected together with opposite polarity, a third capacitor serially connected with said first capacitor across said first and second diodes to form a bridge circuit, a first resistor connected in parallel with said first and third capacitors to provide a discharge path therefor, and a second resistor interconnecting the bridge circuit with the rectifier circuit.